(12) United States Patent
Macaluso et al.

(10) Patent No.: US 7,683,777 B2
(45) Date of Patent: Mar. 23, 2010

(54) METHOD AND SYSTEM FOR AUDIO DISTRIBUTION IN INSTALLATIONS WHERE THE USE OF EXISTING WIRING IS PREFERRED

(75) Inventors: Michael Macaluso, Highland Park, NJ (US); Oleg Logvinov, East Brunswick, NJ (US); Brion Ebert, Easton, PA (US)

(73) Assignee: Arkados Inc, Piscataway, NJ (US)

( * ) Notice: Subject to any disclaimer, the term of this patent is extended or adjusted under 35 U.S.C. 154(b) by 947 days.

(21) Appl. No.: 11/281,155

(22) Filed: Nov. 17, 2005

(65) Prior Publication Data

US 2006/0119176 A1    Jun. 8, 2006

Related U.S. Application Data

(60) Provisional application No. 60/628,845, filed on Nov. 17, 2004.

(51) Int. Cl.
*H04Q 1/30* (2006.01)
*G08B 1/08* (2006.01)
*H04M 11/04* (2006.01)

(52) U.S. Cl. .................. 340/538; 340/310.11

(58) Field of Classification Search ................. 340/538, 340/310.11, 310.12, 538.15, 538.17, 310.16, 340/825.24; 381/58, 59
See application file for complete search history.

(56) References Cited

U.S. PATENT DOCUMENTS

| | | | | | |
|---|---|---|---|---|---|
| 4,200,862 | A | * | 4/1980 | Campbell et al. | 340/310.11 |
| 4,418,333 | A | * | 11/1983 | Schwarzbach et al. | 340/310.11 |
| 4,755,792 | A | * | 7/1988 | Pezzolo et al. | 340/538.17 |
| 5,905,442 | A | * | 5/1999 | Mosebrook et al. | 340/310.16 |
| 6,297,746 | B1 | * | 10/2001 | Nakazawa et al. | 340/310.16 |
| 6,822,555 | B2 | * | 11/2004 | Mansfield et al. | 340/538.11 |
| 7,304,567 | B2 | * | 12/2007 | Canfield | 340/310.12 |
| 2004/0207342 | A1 | * | 10/2004 | Novikov | 340/310.01 |
| 2007/0110192 | A1 | * | 5/2007 | Steiner | 340/310.11 |
| 2007/0274532 | A1 | * | 11/2007 | Adachi et al. | 340/310.11 |

* cited by examiner

*Primary Examiner*—John A Tweel, Jr.

(57) ABSTRACT

When an audio distribution system is installed, it is normally required to install wiring between the audio source or sources, and all of the speakers that are installed throughout a building or structure. The installation of this wiring is normally time consuming and difficult, and can be a large cost component of the system installation. Therefore, there is a need for an audio distribution system that makes use of, and takes a benefit from, already installed electrical power wiring, or allows a lesser number of wires to be run where new installations are necessary, through the means of upgrading the system to provide uninterrupted power to the powered speakers while maintaining the ability to control lighting fixtures powered through the same wiring infrastructure.

23 Claims, 2 Drawing Sheets

METHOD AND SYSTEM FOR AUDIO DISTRIBUTION IN INSTALLATIONS WHERE THE USE OF EXISTING WIRING IS PREFERRED

CROSS REFERENCE TO RELATED APPLICATION

This application claims the benefit of U.S. Provisional Application No. 60/628,845 filed Nov. 17, 2004, assigned to the assignee of this application and incorporated by reference herein.

FIELD OF THE INVENTION

This invention relates generally to the distribution of content, such as audio, video or other data, over conventional electric power conveying media utilized as a local communications network, such as a power line network, and more particularly, to utilizing the existing wiring infrastructure for newly added audio distribution. This invention has uses on a common local power line network in a home, business or other environment, which can be used to support communication between electronic appliances coupled to these lines. This invention can also provide a means for accomplishing audio distribution in new installations with lesser wiring.

BACKGROUND OF THE INVENTION

The delivery of audio signals to speakers located throughout a building structure is typically associated with the need to run dedicated wires to connect the speakers to amplifiers and/or volume controls that may be located somewhere else within the same building structure. A power line communications ("PLC") system, which converts electrical wiring into a distribution system that can carry both power and communications signals can solve this problem. As a result, the use of a PLC system to provide communications services can lead to a tremendous savings in installation costs, which in turn can translate into lower costs for services and applications to the end consumer.

One possible application of the above-said system could be in the installation of in-wall and in-ceiling mounted speakers. Such speakers would require both audio signals and power to be brought to them. The use of wiring that may exist for providing power for the lighting would be very attractive in this case, but there is a problem. The circuit that powers the lights may be interrupted when the lights are switched off. Therefore a solution has to be found to provide the audio signals and the power to speakers even when the lights are turned off.

The proposed invention provides a means to upgrade the electric wiring to be used for both, power and audio signal delivery at the same time regardless of the desired operational condition of the lighting.

SUMMARY OF THE INVENTION

In accordance with the present invention, an audio distribution system uses the same wiring that is used for the powering of the ceiling, wall, and any other type of mounted lights. The inventive system contains the necessary components and uses methods that provide for a dual use functionality of the existing or newly installed power wiring.

An originating point of the audio signal may be located anywhere in a building structure, but in-ceiling and in-wall speakers are typically located in the proximity of the ceiling and/or wall-mounted lights. In this scenario sending audio signals over powerline may provide a simple and efficient solution that may greatly reduce or completely eliminate the need for installing additional low voltage (signal) wiring and additional power wiring.

The power wiring in the ceiling and in some of the walls typically provides the power to either power outlets that may or may not be controlled by the means of switches installed somewhere else in the circuit, or provide power to lighting fixtures that are typically controlled by the means of switches or dimmers installed on the same circuits and physically located in easily accessible locations. That presents a problem, for often the use of audio signals (music, intercom, etc.) is not synchronized with the use of lights. During the daytime, as an example, the lights are likely to be turned off while the music would be switched on.

The present invention provides a method of upgrading the wiring infrastructure and converts it into a system capable of delivering audio signals and power that powers the lights independently from the desired status of either device class.

In the proposed invention, regular light switches and dimmers are replaced with new devices that do not interrupt circuits, but generate special control signals that are transmitted over the same powerline to remotely controlled switches and dimmers either collocated with powered speakers or in lighting fixtures.

Audio signals are transmitted over the same powerline by a means of special modulation and demodulation techniques, such as Orthogonal Frequency Division Multiplexing (OFDM) based methods, and delivery protocols that could be based on some of the existing technologies known in the industry, such as the ones proposed by the HomePlug Powerline Alliance (www.homeplug.org).

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF THE INVENTION

Figure 1:
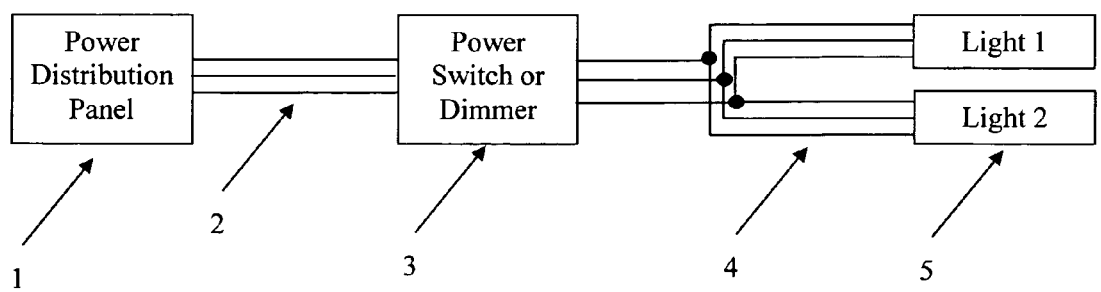
FIG. 1 Depicts prior art, a traditional segment of a power distribution network where 1 is a power distribution panel connected through wiring 2 to the switch 3, wiring 4 connects lights 5 to switch 3.

FIG. 1 shows a typical power distribution segment that would be present in commercial buildings, offices, and homes that would supply power to devices and lighting. There would be a power distribution panel (1) that would likely be located at or near the power entry point into the structure, which would likely have fuses or breakers between the incoming power and the various branch circuits (2) that would be distributed throughout the building. These branch circuits would be connected to power switches and dimmers (3) that would also be connected to power wiring (4) to control the lighting units (5) distributed throughout the structure.

Figure 2:
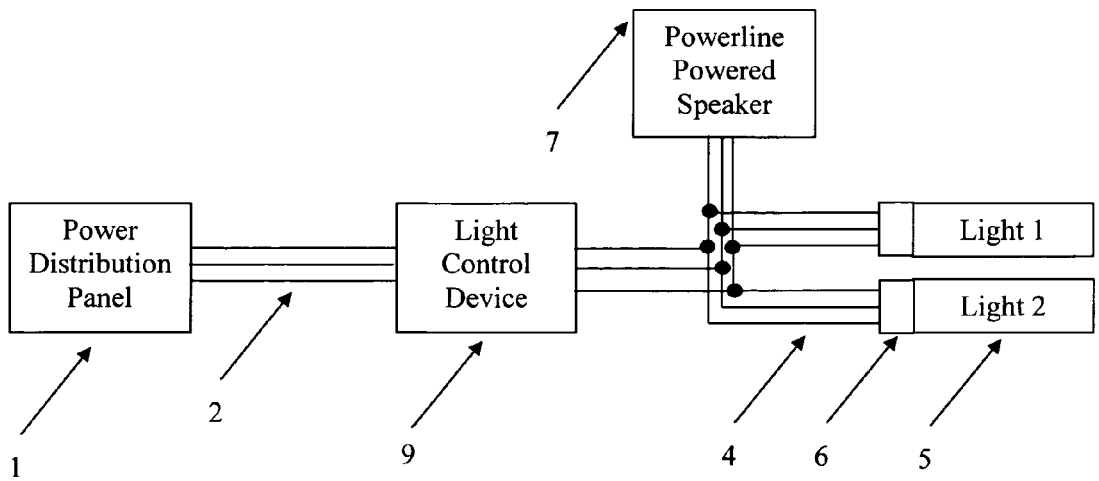
FIG. 2 Depicts one possible embodiment of a system based on the present invention. 1 is a power distribution panel connected through wiring 2 to the light control device 9, wiring 4 connects powerline powered speakers 7 and light control 6, light control 6 drives the power to lights 5.

FIG. 2 shows one possible preferred embodiment of the inventive system, where the existing wiring is used to send audio signals and power to speakers that would be located or installed near the existing lights and powered by the power line. In this scenario, a control unit or units (6) would be added to control lights (5), and the existing light switches or dimmers (3) would be modified or replaced with a lighting control device (9). The lighting control device (9) could consist of an add-on device that would be inserted into the junction box and connected to the exiting switches or dimmers, or it could be a replacement switch and/or dimmer. In either case, the lighting control device would send out control signals over the power line, based on external input (switching the switch on or off, or adjusting the dimmer), to the control unit or units (6). This would allow the power line powered speaker (7) to retain power, while still having the same lighting control as before. Signals would be sent from the lighting control device (9) over the power line to the control units (6) to turn on and off power to the lights (5) without losing power to the speaker. The audio signals for the speaker would also be injected and sent over the power line, where the injection point could be at any point in the power distribution network, depending on where the source may be located (not shown).

Figure 3:
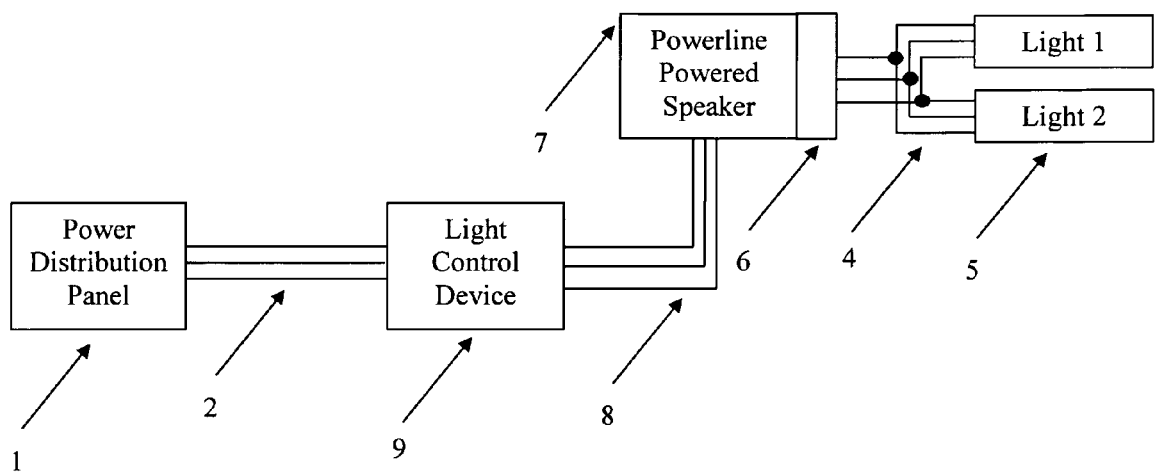
FIG. 3 Depicts another possible embodiment of a system based on the present invention. 1 is a power distribution panel connected through wiring 2 to the light control device 9, wiring 8 connects powerline powered speakers 7 to the light control device 9, wiring 4 connects light control device 6 to lights 5.

FIG. 3 shows another possible preferred embodiment of the invention, where the control unit (6) is connected to, or part of, the power line powered speaker (7). In this embodiment, the speaker could be connected at any point in the wiring (8) and (4) that exists between the lighting control device (9) and the lights (5). This is also true of FIG. 2, but the advantage of this embodiment is that there does not need to be any devices installed for each of the lights, the speaker with the control device can just be spliced into the existing wiring.

Although preferred embodiments of the present invention have been described and illustrated, it will be apparent to those skilled in the art that various modifications may be made without departing from the principles of the invention.

What is claimed is:

1. A method and system for transmitting audio signals from a source to at least one of a powerline powered destination speaker using a previously installed electrical wiring that includes at least one of a conventional power switch or dimmer used to control lighting, comprising;
   at least one of a light control device that replaces the conventional power switches or dimmers and generates powerline communications control signals,
   a light control that is added to at least one of a conventional fixture which receives the powerline communications signals and controls at least one of a light in response to the powerline communications signals,
   a powerline powered destination speaker that is attached to the previously installed electrical wiring between the lighting control device and the light control,
   wherein utility electrical power on the previously installed electrical wiring remains present at all times and is used to deliver power to the powerline powered destination speakers that also receive the audio signal from the source through the same previously installed electrical wiring, to the light control device that sends control signals to the light control, and to the light control which provides illumination power to the lights.

2. The method of claim 1, where the powerline communication signals utilize modulated signal transmission techniques over the previously installed electrical wiring.

3. The method of claim 1, where the powerline communication signals utilize packetized data transmission to communicate over the previously installed electrical wiring.

4. The method of claim 1, where the powerline communication signals utilize power line communications technology specified by the HomePlug Powerline Alliance.

5. The method of claim 1, where the transmitted audio signals utilize data and/or audio compression technology to reduce the bandwidth required for signal transmission.

6. The method of claim 1, where the light control device that replaces at least one switch or dimmer is equipped with a powerline communications transmit functionality only, and the light control that feeds the lights is equipped with a powerline communications receive functionality only.

7. The method of claim 1, where the light control device that replaces the switch or dimmer is capable of bi-directionally communicating and indicating state information.

8. The method in claims 6 and 7 that uses signaling over the power line that utilizes a different frequency band than the technology that is conveying audio signals over the previously installed electrical wiring.

9. The method in claims 6 and 7 that uses signaling over the previously installed electrical wiring that utilizes the same frequency band as the technology that is conveying audio signals over the previously installed electrical wiring.

10. The method in claims 6 and 7 that uses signaling over the previously installed electrical wiring that utilizes the same method of conveying the control and feedback data as the technology conveying the audio signals over the previously installed electrical wiring.

11. The system of claim 1 where the light control device has the capability to convey the transmitted audio signal frequencies in which the audio signals are transmitted and the powerline communications signals without any substantial distortion or attenuation.

12. The light control in claim 1 that is built into at least one powerline powered destination speaker.

13. The conventional fixture in claim 1 into which the light control is built is at least one light fixture.

14. The conventional fixture in claim 1 into which the light control is built is a power outlet.

15. The conventional fixture in claim 1 into which the light control is built is a plug-in device that plugs into common power outlets.

16. The conventional fixture in claim 1 into which the light control is built into is a screw-in device that installs into common light sockets, and allows a common light to be screwed into it.

17. The system and methods in claims 1 through 16 that are also utilized to convey video signals and content.

18. The system and methods in claims 1 through 16 that are also utilized to convey networking signals and content.

19. The system and methods in claims 1 through 16 that are also utilized to convey VoIP signals and content.

20. The system in claim 1 where the lighting control devices that replace conventional power switches or dimmers, generate the powerline communications control signals in response to the position of a user interface such as a toggle or a slider.

21. The system in claim 1 where the switch or dimmer user interface control is an infrared link or a RF link.

22. The system in claim 1 where more than one light control devices is connected on the same previously installed electrical wiring and the light control simply uses the last command it detects, regardless of the light control device that transmitted the signal.

23. The system of claim 1 where each light control device only responds or communicates with one or more specific light controls.

* * * * *